United States Patent
Popov

(12) 
(10) Patent No.: US 6,267,848 B1
(45) Date of Patent: Jul. 31, 2001

(54) METHOD FOR GENERATING VACUUM IN MASS-EXCHANGE COLUMNS

(75) Inventor: Serguei A. Popov, 11707 S. Sam Houston Pkwy. West, #R, Houston, TX (US) 77031

(73) Assignees: Evgueni D. Petroukhine, Limassol (CY); Serguei A. Popov, Budapest (HU)

(*) Notice: Subject to any disclaimer, the term of this patent is extended or adjusted under 35 U.S.C. 154(b) by 0 days.

(21) Appl. No.: 09/367,558

(22) PCT Filed: Dec. 16, 1997

(86) PCT No.: PCT/RU97/00387

§ 371 Date: Aug. 16, 1999

§ 102(e) Date: Aug. 16, 1999

(87) PCT Pub. No.: WO99/30792

PCT Pub. Date: Jun. 24, 1999

(51) Int. Cl.[7] .............................. B01D 3/10; C10G 7/06
(52) U.S. Cl. ..................... 203/91; 203/100; 203/42; 159/DIG. 16
(58) Field of Search ................. 203/91, DIG. 14, 203/92.1, DIG. 22; 208/343, 366, 342, 341, 344; 202/205, 202, 204, 182–184; 196/140, 114, 138; 62/601, 18; 95/290, 106; 159/DIG. 16

(56) References Cited

U.S. PATENT DOCUMENTS

| 5,049,240 | 9/1991 | Hamer et al. |
| 5,294,303 | * 3/1994 | Robbins .......................... 202/205 |
| 5,345,771 | * 9/1994 | Dinsmore ......................... 62/18 |

FOREIGN PATENT DOCUMENTS

| 2086603 | 8/1997 | (RU) . |
| 2087178 | 8/1997 | (RU) . |
| 2091117 | 9/1997 | (RU) . |
| 2094070 | 10/1997 | (RU) . |
| 2095392 | 11/1997 | (RU) . |
| 1819645 | 6/1993 | (SU) . |

* cited by examiner

Primary Examiner—Virginia Manoharan
(74) Attorney, Agent, or Firm—Mark A. Oathout

(57) ABSTRACT

The present invention pertains to the field of chemical and oil refining technology. In particular, the invention relates to the vacuum distillation of liquid mixtures and relates directly to the separation of liquid mixtures. The main field of application of the invention is rectification of oil stock in the petrochemical industry. The objective of this invention is to reduce power consumption required for generating a vacuum in mass-transfer columns while improving the quality of target products, reducing environmental pollution and increasing the efficiency of separation. According to the invention, a vacuum in a mass transfer column is generated due to condensation of outgoing vapors and evacuation of non-condensable gas-vapors by a vacuum-producing system, which is connected to a vacuum pump and composed of an absorber, a phase separator and a cooler, connected in series. A liquid phase (or mixture of phases) with the lowest possible solidification temperature is used as an absorbent for condensation of the gas-vapors and for producing a vacuum. This liquid phase (or mixture of phases) is pre-separated in the phase separator and is cooled after separation down to a temperature which is not lower than its solidification temperature. The introduced method is less power-intensive and more effective in comparison to the most advanced methods using vacuum pumps.

2 Claims, 1 Drawing Sheet

METHOD FOR GENERATING VACUUM IN MASS-EXCHANGE COLUMNS

BACKGROUND OF THE INVENTION

The present invention pertains to the field of chemical and oil refining processes. In particular, the invention relates to the processes of vacuum distillation of liquid mixtures, which are used for example for fractionation of hydrocarbon liquids, and relates directly to the separation of liquid mixtures.

The invention can be applied in the petrochemical industry for oil stock rectification as well as in chemical, food, pharmaceutical and other industries.

The following methods that are used in oil refining for producing a vacuum are known (see, for example, "Oil technology", the book of L. I. Gurevitch, part 1, Gostoptechizdat, 1952, pages 267–268):

A mechanical method (by dry and wet displacement and rotary pumps);

A physical method based on the instantaneous condensation of the water steam, passing from the top of a column, in a surface or mixing condenser;

A method based on usage of kinetic energy of an active liquid jet in ejectors etc.

A combination of some of the above mentioned methods is used in the method for vacuum processing of a fuel oil introduced in SU (A. C CCCP) No. 1447637, M. cl. C10 G 7/06, 1967.

According to this method a heated-up fuel oil is rectified under vacuum in a vacuum column. The method includes withdrawing of side-cut distillates from the column, bleeding of non-condensable gases and vapors from the top of the column, feeding of the vapors back into the bottom of the column for additional extraction of a distillate fraction under vacuum in the presence of non-condensable gases and vapors of the vacuum column, and condensation and absorption of the distillate fraction, extracted from the residue, by a chilled mixture of the lower side-cut distillate of the vacuum column and distillate fraction.

An imperfection of this method is incomplete utilization of energy of the chilled liquid for condensation of the vapors. That is why a deeper vacuum can not be obtained and the output of the distillate fractions can not be increased.

The closest analogue of the present invention is a method for producing vacuum in mass-transfer columns, wherein suction of un-condensed gases from the top of a column is effected by a chilled reflux, generated as a result of condensation of outgoing hydrocarbon vapors. The hydrocarbon vapors pass from the mass-transfer column into surface condensers. A reflux, generated in the condensers as a result of condensation of the hydrocarbon vapors, drains into a collector. A part of the reflux is fed back into the column for refluxing. A jet pump imparts pressure energy to those parts of the reflux, which ensures suction of gases. After cooling in a cooler the reflux is fed into an ejector, which evacuates gases from the condensers. A mixture of the un-condensed gases and reflux is separated in a separator. The gases are released to the atmosphere or bled for processing (or purification), the reflux passes to the collector for further delivery to the ejector by the jet pump (see SU (A. C CCCP) No. 1019645, M. cl. B01 D 3/00, 1993).

The main imperfection of the analogue method is the necessity to use the total amount of the cooled reflux, condensed from the outgoing vapors, for suction of non-condensable gases. This results in repeated contamination of the reflux by impurity components of the gases and vapors outgoing from the top of the column and consequently in deterioration of the quality of the base distillates so that additional expenses for depuration of the distillates are required.

SUMMARY OF THE INVENTION

The present invention is aimed at a reduction of power inputs required for vacuum processing of oil derivatives, an improvement of the quality of the base products, a reduction of environmental pollution and an increase of separation efficiency.

The objectives of the invention are attained due to application of a method for producing a vacuum consisting condensation of vapors outgoing from a mass-transfer column, suction of non-condensable gases by a vacuum-producing system, which is connected to a vacuum pump and is composed of an absorber, a phase separator and a cooler, connected in series, separation of a liquid phase with the lowest solidification temperature in the phase separator, cooling of the liquid phase after the separation to a temperature which is not lower than the solidification temperature of this liquid, use of the cooled liquid phase as an absorbent for condensation of the vapors and for producing a vacuum.

BRIEF DESCRIPTION OF DRAWINGS

The drawing in FIG. 1 represents a schematic diagram of a system that embodies the introduced method.

DETAILED DESCRIPTION

Figure 1:
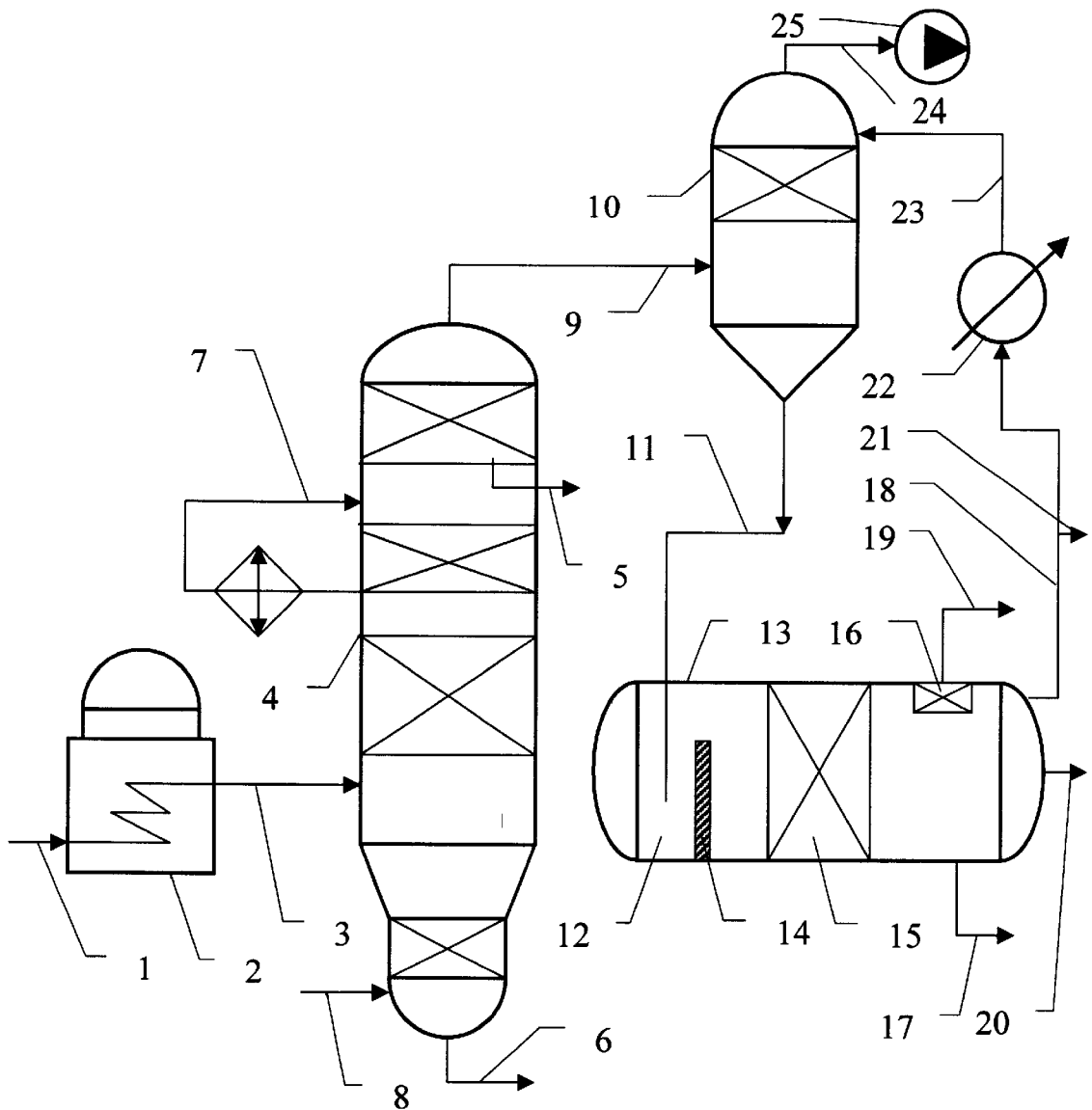

The offered method is implemented as follows.

A stock product, for example fuel oil—the residue of the wet distillation, in the amount of 250 tons/hour is fed through a pipeline 1 into a furnace 2 for preheating. Then the flow of the stock product at a temperature of 385° C. and under a pressure of 200 mm Hg passes through a pipeline 3 into a column 4. A distillate in the amount of 120 tons/hour is bled from the middle section of the column 4 through a pipeline 5. A distillation residual in the amount of 130 tons/hour is bled from the bottom of the column 4 through a pipeline 6. The column has a circulating reflux 7 for abstraction of the excess heat of condensation. Water-steam in the amount of 0.5% of the stock product mass is fed to the bottom of the column through a pipeline 8.

Gases and vapors at a temperature of 120° C. and under a pressure of 26 mm Hg in the total amount of 2400 kg/hour are bled from the top of the column 4 through a pipeline 9 to an absorber 10. A part of the gases and vapors is condensed in the absorber 10 by a cooled absorbent. A mixture of the absorbent and condensed part of gases and vapors at a temperature of 5° C. passes from the absorber 10 through a pipeline 11 to a receiver 12 of a phase separator 13. The receiver 12 constitutes a hydro seal. The two-phase mixture runs from the receiver 12 over a wall 14 into the zone of separation furnished with separating elements 15 (inclined plates, for example—displayed schematically) dividing the mixture into thin layers and providing more intensive separation of phases. In the zone of separation the mixture is separated into gaseous and liquid phases. As a result of the separation the liquid phase is divided into continuous phase layers differing by their relative density (prevalent demulsifiers can be used to promote the process). The gaseous phase is bled after separation through a separator 16 and a pipeline 19.

Thus, the two-phase mixture is separated in the phase separator 13 into the following components (phases): a liquid phase No. 1 (water), a liquid phase No. 2 (hydrocarbons) and a gaseous phase No. 3, which are bled from the phase separator through pipelines 17, 18, 19 accordingly. One of the liquid phase layers (for example water) is a liquid of opposite polarity towards another part of the liquid phase (hydrocarbons). Presence of the polar liquid accelerates separation of the emulsion into the phase layers.

The liquid phase No. 2 can be separated additionally into another two (or more) phase layers differing by their relative density and by freezing point accordingly. This allows (if necessary) extraction of a phase layer No. $2^1$ with different (lower, for example) freezing point from the liquid phase No. 2. Therefore the absorbent with the required freezing point can be selected more precisely. In case the liquid phase is separated into the phase layers it is preferable to bleed each phase layer separately. For example, if the freezing point of the phase layer No. $2^1$ is higher than the same of liquid phase No. 2, the phase layer No. $2^1$ is bled through a pipeline 20 (otherwise it is gainful to use the phase layer No. $2^1$ as the absorbent). An excess amount of the liquid phase used as the absorbent (No. 2 for example) is bled from the system through a pipeline 21. The remainder of this liquid phase is fed into a cooler 22, where it is cooled down to $-5°$ C. Then the cooled liquid phase—absorbent is fed into the top of the absorber 10 through a pipeline 23. The non-condensable gas-vapors at a temperature of $-4°$ C. and under a pressure of 28 mm Hg in the amount of 268 kg/hour are evacuated from the top of the absorber 10 by a vacuum pump 25 through a vacuum pipeline 24.

Industrial applicability: The invention may be applied in oil refining, chemical and other industries, which are connected with processing of hydrocarbon liquids as a feed stock and as a freak stock. Integration of the described method with the traditional process schemes of fractionation in combination with the rational transfer of hydrocarbon liquids from one process position to another is possible.

The application of the offered method reduces energy inputs required for producing vacuum because it provides a reduction of the vacuum pump load. Besides, a deeper vacuum can be achieved due to the use of a distillate fraction (a mixture of hydrocarbons), whose freezing point is below zero, as the absorbent. It is possible to match the absorbent with the required freezing point by very accurately varying the composition of the absorbent mixture (the composition of this mixture depends on the column's design—quantity of theoretical plates at the top of the column, for example—and its process parameters). The "absorber—phase separator" circulation system does not require a make up supply of liquid, as the system produces minimal quantities of contaminated products, which can be bled as separate flows and recovered easily.

The offered method can be used also for the distillation of fuel oil. In this case it is not necessary to use liquids of opposite polarity as the evaporating agents, because, according to the method, the temperature of the circulating absorbent (at the outlet of the cooler 22) is always higher than its freezing point.

In practice the introduced method for producing a vacuum is at least our times more efficient in comparison with the most advanced methods using vacuum pumps.

What is claimed is:

1. A method for producing a vacuum in a mass-transfer column, consisting the steps of:

condensing an outgoing vapor from a mass-transfer column;

suctioning a non-condensable gas by a vacuum-producing system connected to a vacuum pump, the vacuum producing system including an absorber, a phase separator and a cooler connected in series;

separating a liquid phase with a lowest freezing temperature in the phase separator; cooling the liquid phase after said separating step down to a temperature which is not lower than a solidification temperature of the liquid phase; and using the liquid phase after said cooling step as an absorbent for said condensing step and for producing the vacuum.

2. A method for producing a vacuum in a mass-transfer column, consisting the steps of:

condensing an outgoing vapor from a mass-transfer column to form a non-condensable gas and a mixture of an absorbent and a condensate;

evacuating the non-condensable gas;

passing the mixture to a phase separator;

separating a liquid phase with a lowest freezing temperature in the phase separator;

cooling the liquid phase after said separating step down to a temperature which is not lower than a solidification temperature of the liquid phase; and using the liquid phase after said cooling step as the absorbent for said condensing step and for producing the vacuum.

* * * * *